US012572545B2

(12) United States Patent
Baker et al.

(10) Patent No.: US 12,572,545 B2
(45) Date of Patent: Mar. 10, 2026

(54) QUERY EXECUTION PLANNING FOR ONTOLOGY-BASED DATABASES

(71) Applicant: Palantir Technologies Inc., Denver, CO (US)

(72) Inventors: James Baker, Maidenhead (GB); Xavier Falco, London (GB); Samuel Flavio Barroso Souza, London (GB); Amr Al Mallah, Tacoma, WA (US); Yixun Xu, Jersey City, NJ (US); Arseny Bogomolov, Arlington, VA (US); Slawomir Mucha, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/807,823

(22) Filed: Aug. 16, 2024

(65) Prior Publication Data

US 2025/0384040 A1      Dec. 18, 2025

Related U.S. Application Data

(60) Provisional application No. 63/660,975, filed on Jun. 17, 2024.

(51) Int. Cl.
*G06F 16/2453*      (2019.01)

(52) U.S. Cl.
CPC .. *G06F 16/24545* (2019.01); *G06F 16/24544* (2019.01)

(58) Field of Classification Search
None
See application file for complete search history.

(56) References Cited

U.S. PATENT DOCUMENTS

| | | | |
|---|---|---|---|
| 8,332,389 B2 | 12/2012 | Bestgen et al. | |
| 8,650,634 B2 * | 2/2014 | Bajekal | G06F 16/2445 |
| 9,690,792 B2 | 6/2017 | Bartlett et al. | |
| 10,817,613 B2 | 10/2020 | Akselrod et al. | |
| 11,080,336 B2 | 8/2021 | Van Dusen | |
| 11,544,264 B2 * | 1/2023 | Mathew | G06F 16/24544 |

(Continued)

OTHER PUBLICATIONS

U.S. Appl. No. 18/768,985, filed Jul. 10, 2024.

(Continued)

*Primary Examiner* — Son T Hoang
(74) *Attorney, Agent, or Firm* — Duane Morris LLP

(57) ABSTRACT

A system for query execution planning over ontology-based databases and related methods are disclosed. The system is programmed to receive an ontology query from a user account against an ontology having access controls, and transform the ontology query into a set of database queries, including a plurality of joins. The system is programmed to compute the amounts of data processing associated with executing the plurality of joins in different orders on a sample of the databases representing the ontology, considering how much data in the ontology can be accessed by the user account under the access controls, and determine an execution plan corresponding to a preferred amount of data processing. Furthermore, the system is programmed to (Continued)

Receive an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties — 602

Identify a set of permissions for accessing the ontology associated with a user account of the user device — 604

Transform the ontology query to a set of database queries, including a plurality of joins — 606

Estimate an amount of data processing associated with executing the set of database queries on the ontology, comprising executing the plurality of joins in a specific order on a sample of the ontology based on the set of permissions — 608

Determine an execution plan for the set of database queries based on a result of the estimating — 610

Cause executing the set of database queries on the ontology according to the execution plan — 612

Transmit a reply to the ontology query to the user device based on a result of the executing — 614 execute the set of database queries on the databases according to the execution plan, and transmit a reply to the ontology query to the user device based on a result of the execution.

20 Claims, 7 Drawing Sheets

(56) References Cited

U.S. PATENT DOCUMENTS

| | | | |
|---|---|---|---|
| 11,971,888 | B2 | 4/2024 | Chen et al. |
| 12,124,472 | B2 * | 10/2024 | Kramer ................. G06F 16/256 |
| 12,174,992 | B1 | 12/2024 | Fakhraie et al. |
| 2004/0003132 | A1 | 1/2004 | Stanley et al. |
| 2006/0165040 | A1 | 7/2006 | Rathod et al. |
| 2011/0276396 | A1 | 11/2011 | Rathod |
| 2014/0310302 | A1 * | 10/2014 | Wu ........................ G06F 16/245 |
| | | | 707/769 |
| 2016/0117195 | A1 | 4/2016 | Wang |
| 2018/0322168 | A1 | 11/2018 | Levine et al. |
| 2019/0155804 | A1 * | 5/2019 | Miller ................. G06F 16/2477 |
| 2021/0294970 | A1 * | 9/2021 | Bender ................. G06F 16/328 |
| 2022/0253474 | A1 * | 8/2022 | Acharya ............. G06F 16/2438 |
| 2023/0273947 | A1 | 8/2023 | Weitzner et al. |
| 2023/0297550 | A1 | 9/2023 | Kumar et al. |
| 2023/0315529 | A1 | 10/2023 | Gristede et al. |
| 2023/0418793 | A1 | 12/2023 | Urdiales et al. |
| 2024/0095680 | A1 | 3/2024 | Lee et al. |
| 2024/0354326 | A1 | 10/2024 | Baker et al. |

OTHER PUBLICATIONS

U.S. Appl. No. 18/882,541, filed Sep. 11, 2024.
"Documentation: Spark > Core Concepts." Palantir, Retrieved Apr. 30, 2024, www.palantir.com/docs/foundry/optimizing-pipelines/spark-concepts/, 6 pages.
"Documentation: Overview and Getting Started > Aggregation Considerations." Palantir, Retrieved Apr. 29, 2024, www.palantir.com/docs/foundry/object-backend/aggregation-considerations/, 8 pages.
Minier, Thomas, et al., "SaGe: Preemptive Query Execution for High Data Availability on the Web," Hal Open Science, Jun. 3, 2018, https://hal.science/hal-01806486, 17 pages.
"Fair Scheduler—Apache Hadoop," The Apache Software Foundation, May 18, 2022, https://hadoop.apache.org/docs/r1.2. 1/fair_scheduler.html, 7 pages.
Extended European Search Report in EP Application No. 25176171. 4, dated Oct. 10, 2025, 9 pages.
Extended European Search Report in EP Application No. 25179700. 7, dated Oct. 31, 2025, 10 pages.
Endris, Kemele, et al. "Chapter 5 Federated Query Processing", Jul. 16, 2020, Jul. 16, 2020, p. 73-86, XP047557047.
"Greenplum Database 3.2 Administrator Guide", Internet Citation, Oct. 1, 2008 (Oct. 1, 2008), pp. 1-849, XP008149266, Retrieved from the Internet: URL: http://docs.huihoo.com/greenplum/GPDB-3.2-AdminGuide.pdf [retrieved on Feb. 22, 2012].
Extended European Search Report in EP Application No. 25185344. 6, dated Dec. 16, 2025, in 11 pages.
U.S. Appl. No. 18/882,541 Non-Final Office Action dated Jan. 15, 2026.

* cited by examiner

Figure 4:
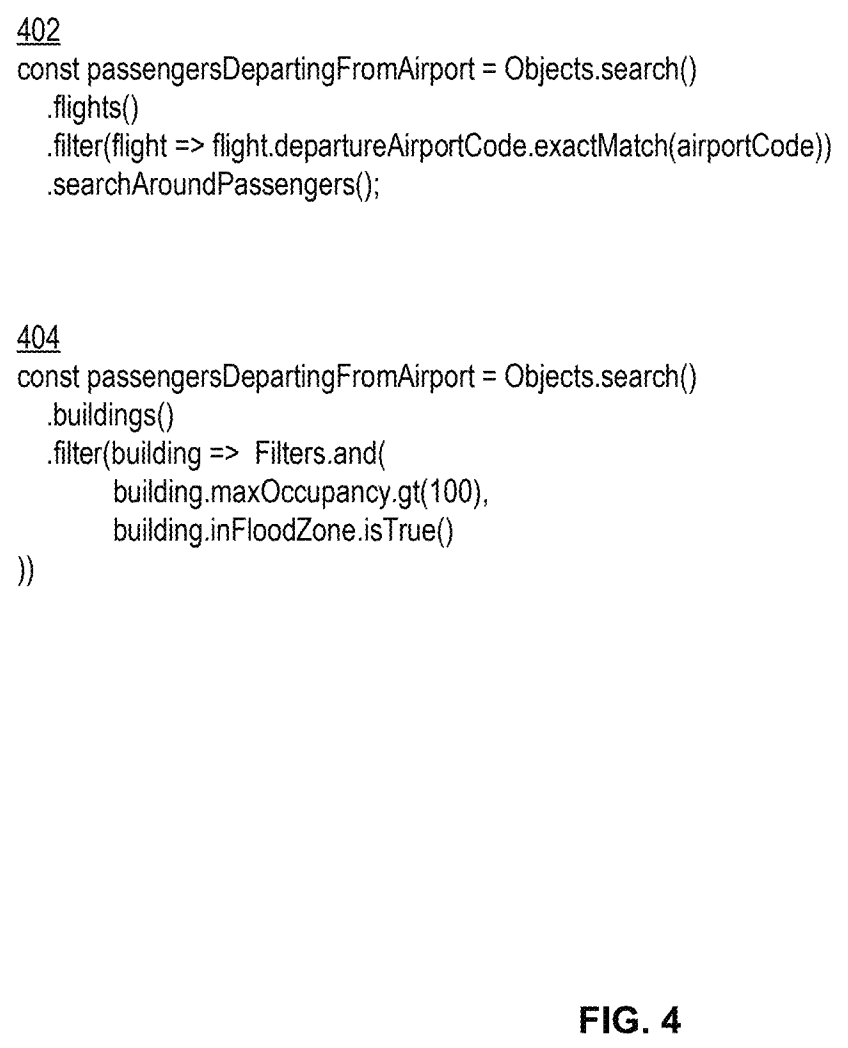

```
402
const passengersDepartingFromAirport = Objects.search()
  .flights()
  .filter(flight => flight.departureAirportCode.exactMatch(airportCode))
  .searchAroundPassengers();
```

```
404
const passengersDepartingFromAirport = Objects.search()
  .buildings()
  .filter(building => Filters.and(
      building.maxOccupancy.gt(100),
      building.inFloodZone.isTrue()
  ))
```

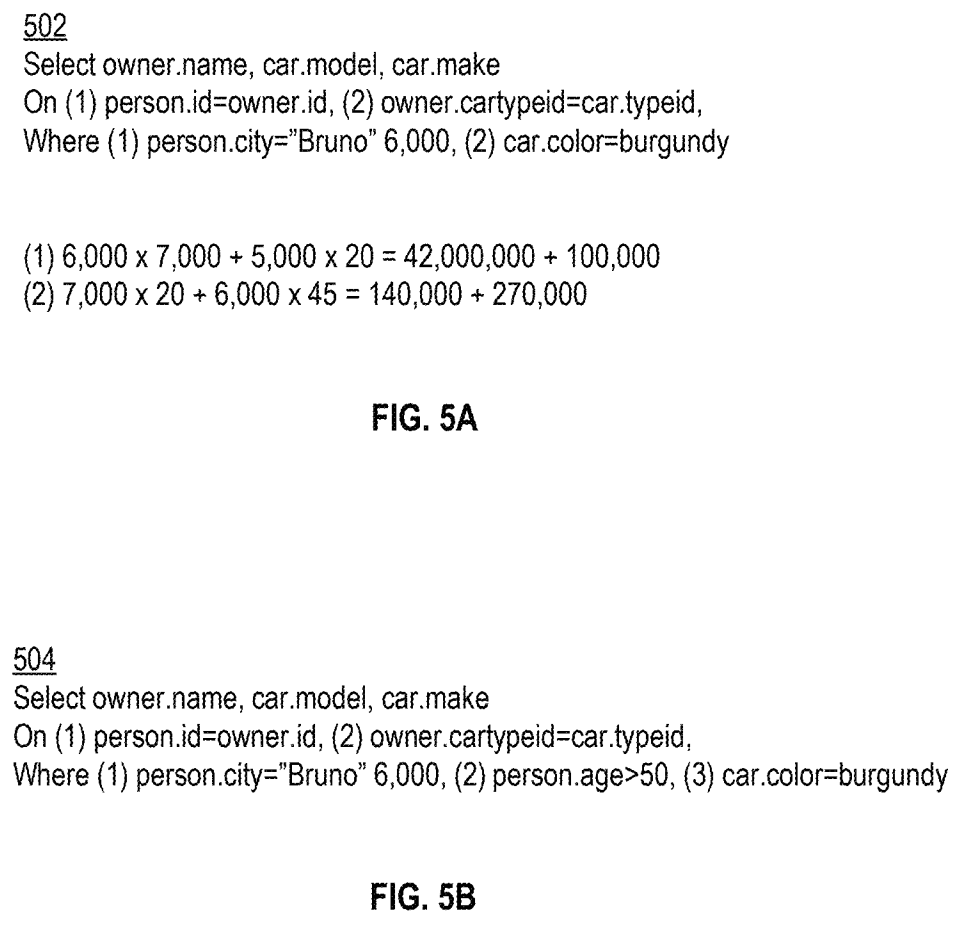

Select owner.name, car.model, car.make

On (1) person.id=owner.id, (2) owner.cartypeid=car.typeid,

Where (1) person.city="Bruno" 6,000, (2) car.color=burgundy (1) 6,000 x 7,000 + 5,000 x 20 = 42,000,000 + 100,000

Select owner.name, car.model, car.make

On (1) person.id=owner.id, (2) owner.cartypeid=car.typeid,

Where (1) person.city="Bruno" 6,000, (2) person.age>50, (3) car.color=burgundy

FIG. 5B

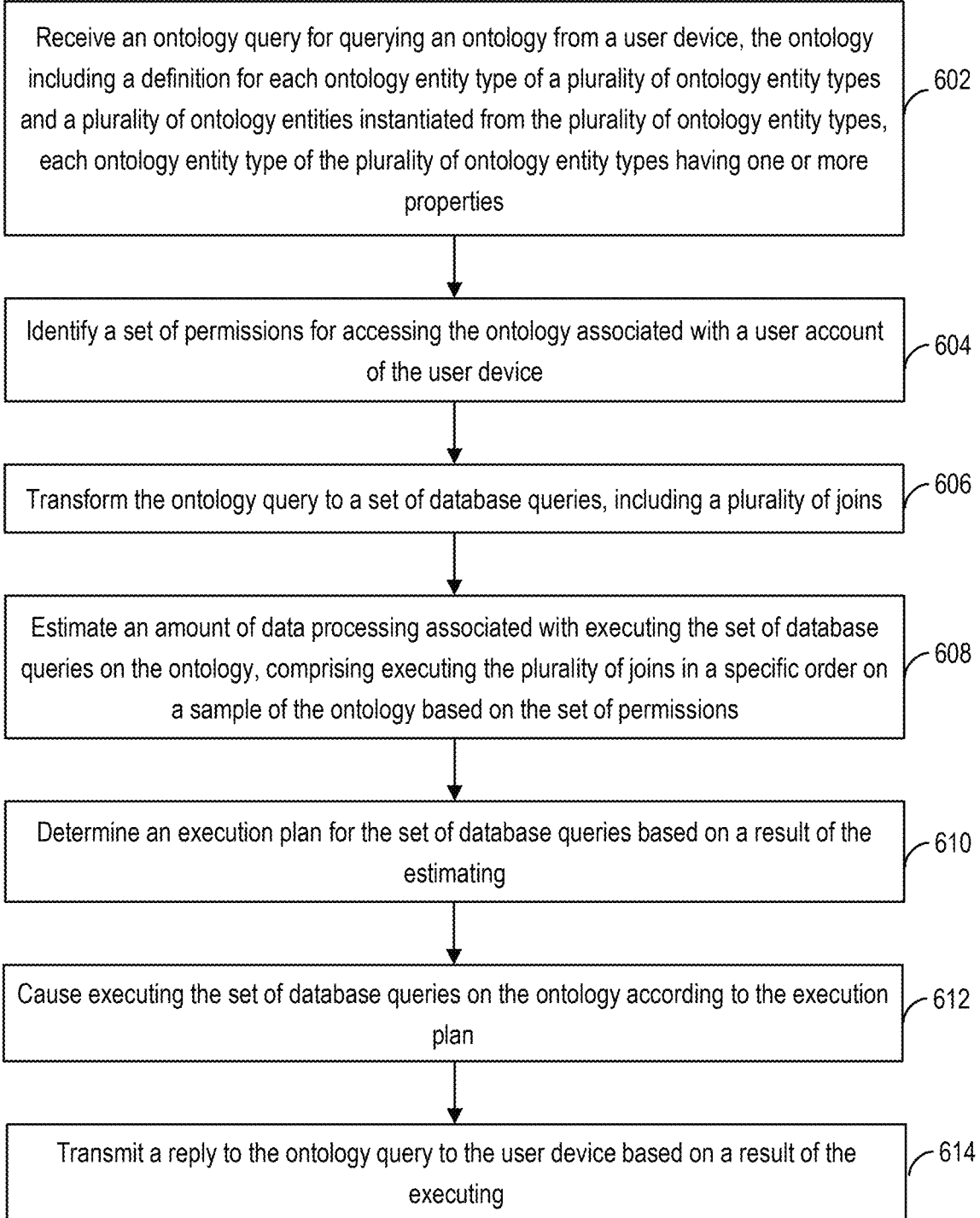

Receive an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties ⟋602

Identify a set of permissions for accessing the ontology associated with a user account of the user device ⟋604

Transform the ontology query to a set of database queries, including a plurality of joins ⟋606

Estimate an amount of data processing associated with executing the set of database queries on the ontology, comprising executing the plurality of joins in a specific order on a sample of the ontology based on the set of permissions ⟋608

Determine an execution plan for the set of database queries based on a result of the estimating ⟋610

Cause executing the set of database queries on the ontology according to the execution plan ⟋612

Transmit a reply to the ontology query to the user device based on a result of the executing ⟋614

FIG. 6

QUERY EXECUTION PLANNING FOR ONTOLOGY-BASED DATABASES

BENEFIT CLAIM

This application claims the benefit under 35 U.S.C. § 119(e) of U.S. Provisional Application No. 63/660,975, titled "QUERY EXECUTION PLANNING FOR ONTOL-OGY-BASED DATABASES" and filed on Jun. 17, 2024, the entire contents of which are hereby incorporated by reference as if fully set forth herein.

TECHNICAL FIELD

The present disclosure relates to ontology-based database operations, and more particularly to database operations related to querying and access control.

BACKGROUND

Data originating from data sources can be organized and structured according to an ontology, which facilitates understanding of and access to the data. The ontology can be backed by databases where the data is stored. It would be helpful to properly manage the databases while fully supporting operations of the ontology.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 4 illustrates examples calls to an application programming interface (API) for querying an ontology.

FIG. 5A illustrates an example set of database queries including joins.

FIG. 5B illustrates another example set of database queries including joins.

FIG. 6 illustrates a process of query execution planning over ontology-based databases in accordance with disclosed embodiments.

DETAILED DESCRIPTION OF CERTAIN EMBODIMENTS

Figure 1:
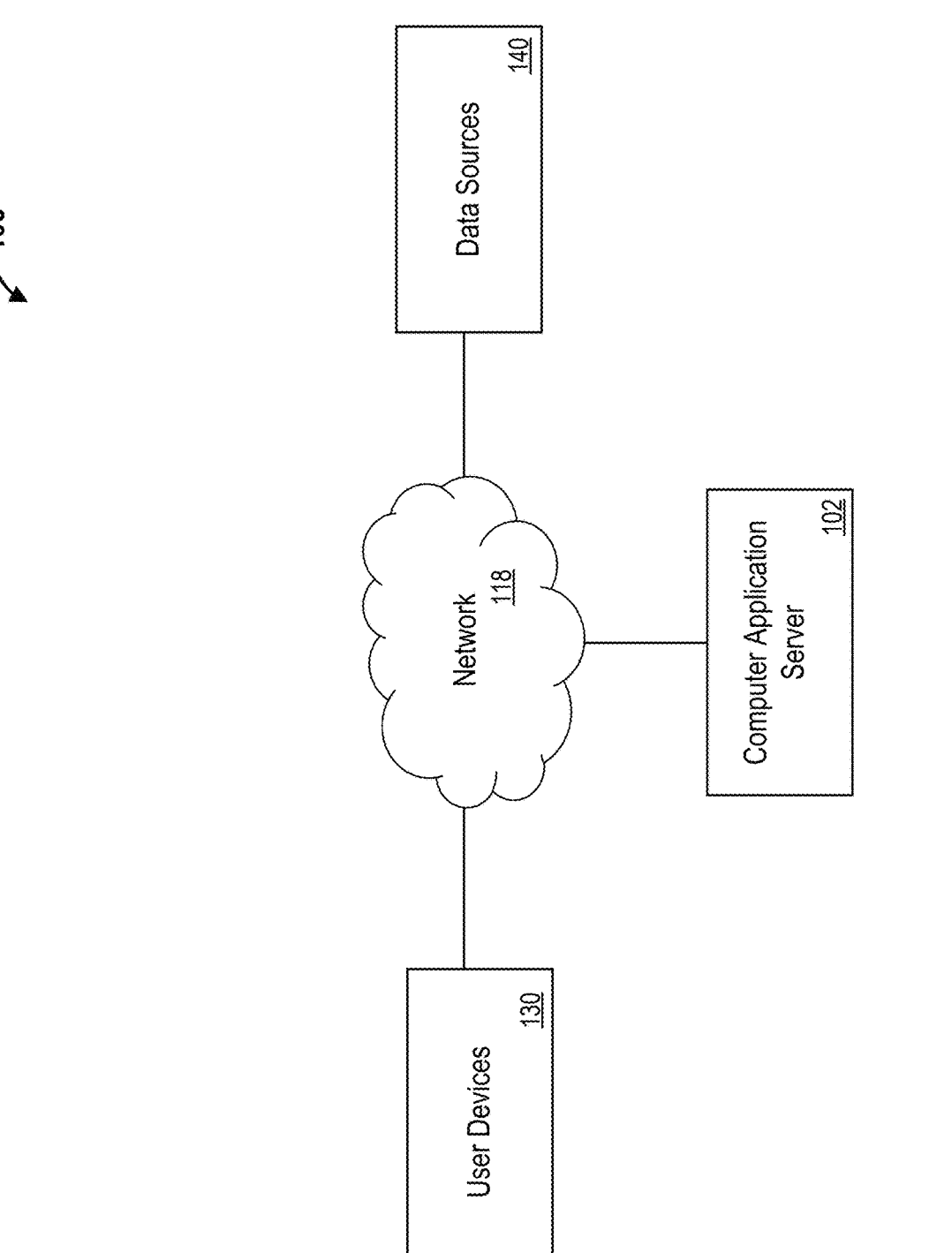
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for query execution planning over ontology-based databases and related methods are disclosed. The system is programmed to receive an ontology query from a user account against an ontology having access controls, and transform the ontology query into a set of database queries, including a plurality of joins. The system is programmed to compute the amounts of data processing associated with executing the plurality of joins in different orders on a sample of the databases representing the ontology, considering how much data in the ontology can be accessed by the user account under the access controls, and determine an execution plan corresponding to a preferred amount of data processing. Furthermore, the system is programmed to execute the set of database queries on the databases according to the execution plan, and transmit a reply to the ontology query to the user device based on a result of the execution.

In some embodiments, the system is programmed to manage the ontology, which includes definitions of ontology entity types, and ontology entities that are instantiated from the ontology entity types. An ontology entity type is generally an object type or a link type and has one or more properties. For example, an ontology object type can correspond to a person and has properties corresponding to a person's residence and occupation, and an ontology link type can correspond to a relationship between two people.

In some embodiments, the system is programmed to represent each ontology entity type and thus each ontology entity of the ontology entity type in multiple forms respectively in multiple databases having different capabilities. As one example, a first database can be a relational database that is particularly suitable for exploring properties of ontology entities, while a second database can be a graph database that is especially suited for exploring relationships between ontology entities. As another example, a third database can represent certain properties in a compressed or encrypted form that is not suitable for querying, while a fourth database can include an index for a certain combination of properties that facilitate specific access to the combination of properties.

In some embodiments, the system is programmed to receive an ontology query against the ontology from a user account. A first example is finding the top three colors for cars in New York, which involves computing maximums over ontology entities. A second example is finding names of family members of passengers of a flight that arrived in New York, which involves combining data from different ontology entity types. The system can be programmed to select one or more databases where the ontology entity types covered by the ontology query are represented. In the second example above, the ontology entity types covered by the ontology query can be the person object type, family link type, passenger link type, and flight object type. Therefore, the system can be configured to find one or more databases that represent these ontology entity types and allow efficient processing of ontology entities of these ontology entity types. Each of the one or more databases can be selected because it represents a large number of the relevant ontology entity types, or enables fast access of relevant properties of these ontology entity types, for instance. The system can then be further programmed to transform the ontology query into database queries, including a plurality of related joins, based on transformations between definitions for these ontology entity types and schemas for the one or more databases.

In some embodiments, the system is programmed to determine an optimal execution plan by estimating the amounts of data processing respectively associated with different approaches of executing the plurality of related joins, such as different orders of execution. For a selected database having tables of rows and columns, the plurality of related joins corresponds to joining data in multiple tables altogether, where the result of one join affects another join of the plurality of joins. In the second example above of finding names of family members of passengers of a flight that arrived in New York, the database queries can involve joining data from a person table, a family table, a passenger table, and a flight table. A first join of the flight table and the passenger table can result in a list of passengers of flights that arrived in New York, which can be used to reduce the size of a second join of the passenger table and the family table that could have resulted in a list of all family members of passengers of flights. Therefore, different orders of execution could lead to different amounts of data processing.

In some embodiments, the system is programmed to perform the estimation by implementing the different approaches of executing the plurality of joins using a sample of the one or more databases. The system can be programmed to maintain a plurality of shards in a distributed environment for a selected database. The system can be further programmed to assign data to be stored in the selected database to one of the shards based on hashed sharding or another sharding architecture that is generally agonistic to the nature of the data. The system can then be programmed to use a single shard as part of the sample. Therefore, the system is programmed to execute the plurality of joins on the sample only and extrapolate the result to obtain an estimate of the amount of data processing associated with executing the plurality of joins on the one or more databases.

In some embodiments, the system is further programmed to perform the estimation by evaluating how the set of permissions associated with the user account can reduce the amount of data processing. In the second example above, the set of permissions associated with the user account may disallow accessing information regarding flight objects having the property value of arriving in certain airports in New York. When each flight object is represented as a row of a table in a selected database, for instance, the set of permissions can reduce the number of rows to access and thus the amount of data processing to perform.

In some embodiments, the system is programmed to cause execution of the database queries according to the execution plan. The system is programmed to subsequently obtain a result of the execution, transform the result back to ontology data based on the transformations noted above, and return the ontology data in response to the ontology query.

The system disclosed herein has several technical benefits. An ontology provides a structure to any large volume of data, which facilitates user interaction with the data. By providing a unified interface for querying the ontology, the system allows a focus on the ontology without requiring knowledge of how ontology data is represented or where the ontology is stored. By automatically selecting appropriate databases for executing database queries derived from an ontology query, the system achieves improved performance from utilizing the most appropriate capabilities to serve the ontology query. By estimating the performance of different approaches of executing the database queries using sampling, the system further improves performance from implementing an optimal execution plan.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer server ("server") 102, one or more user devices 130, and one or more data sources 140, which are communicatively coupled through direct physical connections or via a network 118.

In some embodiments, the server 102 is programmed or configured to manage datasets representing data sources, which are transformed to ontology data, and databases representing the ontology data in multiple forms. The management comprises integrating multiple sources of change to the ontology data, representing changes to the ontology data in different forms, and allow access to the ontology data in various granularities. The server 102 can comprise any centralized or distributed computing facility with sufficient computing power in data processing, data storage, and network communication for performing the above-mentioned functions.

In some embodiments, each user device of the one or more user devices 130 is programmed to submit access requests to the server 102 to access the ontology and receive replies to the access requests from the server 102. The access requests can include reading, writing, adding, or deleting ontology data. Each user device can comprise a personal computing device, such as s desktop computer, laptop computer, tablet computer, smartphone, or wearable device.

In some embodiments, each data source of the one or more data sources 140 is programmed to provide original data to the server 102, which represents the original data as datasets, or accept changes to the original data based on updates to the datasets from the server 102. Each data source can generally be similar to the server 102 and comprise any computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed or configured to receive original data from the one or more data sources 140. The server 102 is programmed to set up datasets representing the one or more data sources 140 and transforming data in the datasets to ontology data. The server 102 is programmed to further represent the ontology data in multiple databases. On the other hand, the server 102 is programmed to receive access requests from the one or more user devices 130, including user edits to the ontology data. The server 102 is programmed to also integrate these user edits into the multiple databases. The server 102 can also be programmed to materialize these user edits into datasets and transform data in these datasets for integrating into the datasets representing the one or more data sources 140 and ultimately updating the one or more data sources 140.

3. Functional Descriptions

Figure 2:
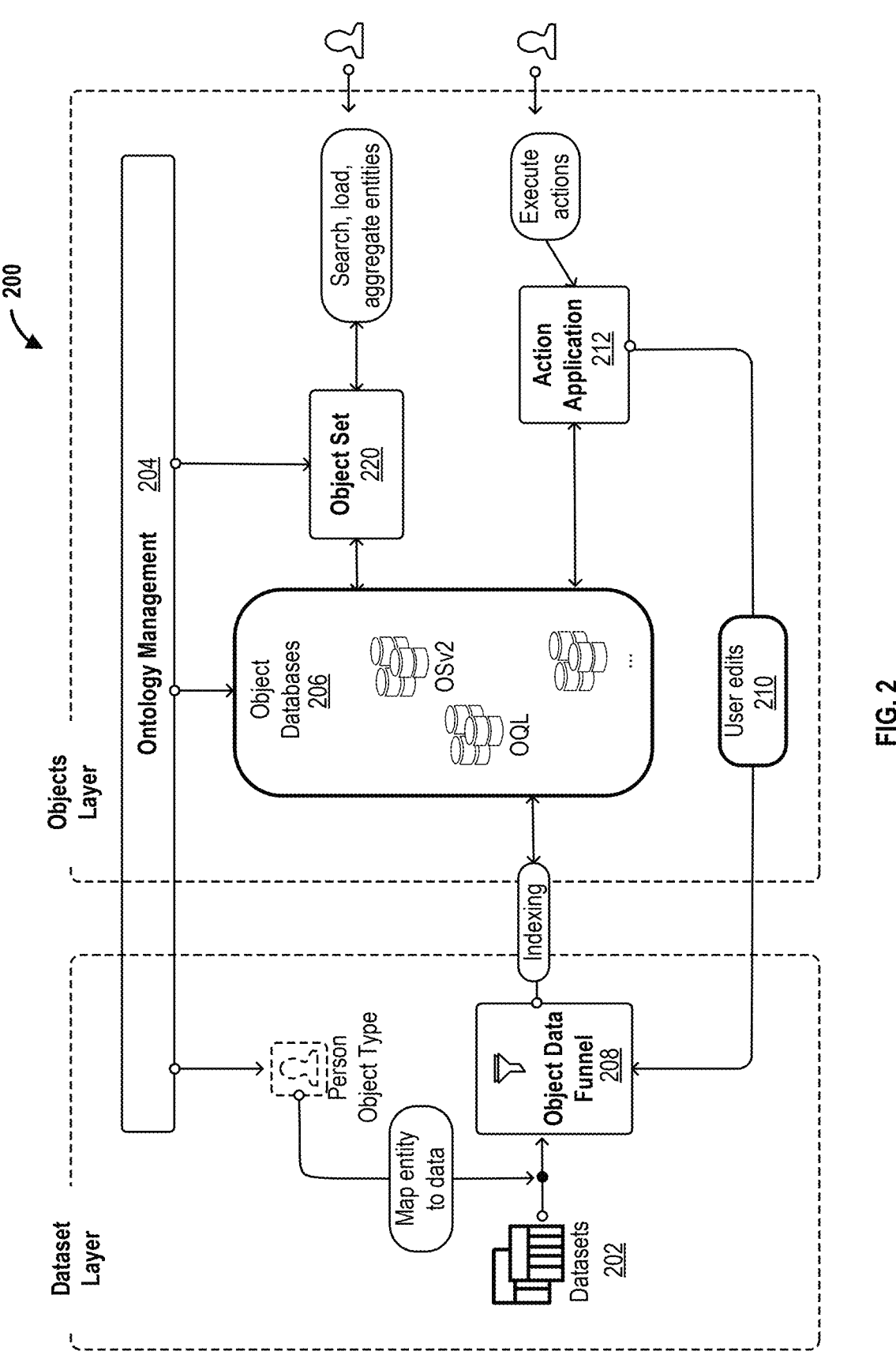
FIG. 2 illustrates an example set of components of and workflows managed by a computer application server ("server").

FIG. 2 illustrates an example set of components of and workflows managed by the server 102. In some embodiments, the server 102 is programmed to receive original data from various data sources and maintain them as datasets 202. The data sources can include file systems, database management systems, streaming sources, or blob stores, for example. A dataset is a wrapper around a collection of files which are stored in a specific file system. The datasets 202 can contain mainly structured and semi-structured data, from which one or more schemas can be inferred. Each schema specifies how a file is to be parsed into a specific format, such as a tabular format having rows and columns.

In some embodiments, the server 102 is programed to establish a mapping between the group of datasets and an ontology via the ontology management 204 as a service. The ontology includes definitions for all relevant object types, such as people, computers, networks, documents, or events, with objects being instantiated from the object types. The ontology can also separately include definitions for all relevant link types, such as similarities or dependencies, with links being instantiated from the link types. Specific structures, such as properties or versions, and specific operations, such as revision, access control, or provenance tracking at the object, link, or property level (or corresponding row or column level) apply to all object types and all link types. The object types and link types are considered as "ontology entity types". The objects and the links are considered as "ontology entities", which encompass the properties. The ontology and relevant metadata are considered as "ontology data". The ontology management 204 can manage definitions for an API that allows access to the ontology entities and the structures. The mapping between the group of datasets and the ontology would associate, for each dataset, one or more ontology entity types to which the dataset can be transformed. The server 102 can be further programmed to establish, for each dataset, a transformation between a schema for the dataset and definitions for the one or more ontology entity types to which the dataset is associated. For example, a column in the schema can be transformed to a property of an object type and vice versa. When more original data is received from the various data sources and maintained as updated datasets, any updates in the updated datasets can be readily converted to ontology data according to the transformation.

In some embodiments, the server 102 is programmed to store representations of ontology entity types and thus ontology entities in one or more ontology databases 206 (also called "object databases") via an ontology data funnel 208 (also called "object data funnel") as a service. The object data funnel 208 implements an indexing process of making the datasets as transformed to corresponding ontology data available in the object databases 206 for fast retrieval in response to user queries. The fast retrieval is achieved by the organization of the ontology, the representation of the ontology data in multiple object databases having different capabilities, and the availability of indices of ontology data and a mapping between the ontology and the object databases 206.

As links connect objects, link information could be considered as part of an object and vice versa. Therefore, representation of link types and that of object types can affect each other. In some embodiments, the server 102 is programmed to represent an object type or link type in different ways in different object databases in accordance with the different capabilities of the different object databases. As one example, in a relational object database, an object may be represented as a row while a property of an object may be represented as a column, which enables fast identification of objects that have certain property values. As another example, in a graph object database, an object may be represented as a node and a link between two objects may be represented as an edge, which enables fast exploration of relationships or links among objects. In other examples, the object databases can specialize in representing a property in a compressed form or an encrypted form, or representing properties in a specific order to form an index.

In some embodiments, the server 102 can be programed to establish the mapping between the object databases and the ontology also via the ontology management 204. This mapping would associate, for each ontology entity type, one or more object databases to which the ontology entity type can be transformed. The server 102 can be further programmed to establish, for each ontology entity type, a transformation between a definition for the ontology entity type and one or more schemas for the one or more object databases to which the ontology entity type is associated. For example, a property of an object type can be transformed to a column in a schema and vice versa. Subsequently, any changes to the ontology can be readily converted to changes in the object databases 206 according to this transformation.

In some embodiments, the server 102 is programmed to represent each ontology entity type in at least one of the object databases 206, with the one being considered as the canonical object database for the ontology entity type. The server 102 can be programmed to also represent the ontology entity type in one or more secondary object databases. As changes are made to the ontology data, the indices could be updated as part of the indexing process implemented by the object data funnel 208. In addition, the server 102 can be programmed to represent each ontology entity in different versions in the object databases 206 and preserve versioning consistency across the object databases 206. The availability of a particular version in the canonical object database can be used to determine whether a particular version of an ontology entity is to be served in response to user queries.

In some embodiments, the server 102 is programmed to manage not only objects or links including components originating from only one data source but also objects including components originating from multiple data sources. Each ontology entity that originates from multiple data sources is referred to as a multi-data source ontology entity ("MDO"). An MDO typically has these components that correspond to respective data sources and are separately represented in the object databases 206. For example, separate components could be stored as separate columns in an object database. The server 102 can be further programmed to control access to the ontology data, from the ontology level down to the component level. Such access control can be extended to the object databases 206 where the ontology data are represented.

In some embodiments, the server 102 is programmed to receive queries from a user device associated with a user account and execute the query via the ontology set 220 (also called "object set") as a service. The object set 220 can support the API for querying the ontology noted above. The API would include a set of functions that operate on ontology entity types or ontology properties, such as filters or aggregators. These functions generally correspond to read requests to view ontology data, which require read access to the object databases 206. These functions can also be called to process ontology data before actions are applied, as discussed below. The actions correspond to write requests to modify ontology data, which require write access to the object databases 206.

In some embodiments, the server 102 is programmed to receive an action comprising user edits 210 to ontology data from a user device, and apply the action via the action application 212 as a service. In this ontology context, an action specifies user logic to change data related to one or more ontology entities and is to be performed as a single transaction. In other embodiments, the server 102 is programmed to receive updates to the datasets 202 from the data sources. As noted above, when such updates are received, they can be readily converted to corresponding changes to the ontology data according to the transformation.

In some embodiments, the server 102 is programmed to store representations of ontology data in the object databases 206 via the object data funnel 208, as discussed above. The object data funnel 208 can implement the indexing process by indexing only changes and sending the indexed changes to the object databases 206. As the changes can originate from the user edits 210 or data source updates (that turn into dataset updates), the server 102 can be programmed to resolve any conflicts in the received changes before indexing the changes and sending the indexed changes via the object data funnel 208 to the object databases 206.

3.1. Controlling Ontology Data Permissions

As discussed above, an ontology has objects and links, and each object or link has properties. In addition, each MDO has multiple components corresponding to multiple data sources, where each component includes properties that come from a single one of the multiple data sources. In certain embodiments, different components of an MDO include different properties, thus allowing no duplicity within the object.

In some embodiments, the server 102 is programmed to control access to the ontology at different levels, such as the ontology level, link type level, link level, object type level, object level, component level, or property level. The access control can be defined with respect to a hierarchy of user roles and a set of permissions or access levels.

In some embodiments, the server 102 is programmed to associate each data source with a set of user roles for users or user accounts and corresponding permissions. For example, an ontology owner role has full access including being able to manage permissions, an ontology editor role is less than the owner role by not being able to manage permissions, an ontology viewer role is less than the editor role by not having editing permissions, and an ontology discoverer role is less than the viewer role by only being to see select metadata. In general, each data source leads to a distinct set of object types and link types, and the access control of the data source can determine the access control of the distinct set of object types and link types. In the case of MDOs, multiple data sources lead to an ontology entity type, and the access controls of the data sources can determine the access controls of the multiple components of the ontology entity type. When MDOs are represented in the object databases, such as one with rows and columns, the access controls of the multiple components of each ontology entity type would correspond to column-level access controls.

In some embodiments, the server 102 is programmed to require having permissions to view an entire ontology entity to be able to modify the ontology entity. Therefore, when a user account is granted access by a first data source but not a second data source, the user account would not have access to modify an MDO that originates from both the first data source and the second data source.

In some embodiments, the server 102 is programmed to require permissions as follows for accessing objects of an object type, all properties of which originate from two data sources of D1 and D2. Creating an object of the object type by setting values for the properties that originate from D1 requires only permissions for viewing D1. The values for the properties that originate from D2 could be set to null. Similarly, modifying an object of the object type by setting values for the properties that originate from D1 requires only permissions for viewing D1. Deleting an object of the object type, however, requires permissions for viewing both D1 and D2.

In some embodiments, the server is programmed to require permissions as follows for accessing links of a link type that connects two object types. The first object type has all properties originating from D1, and the second object type has all properties originating from D2. Creating or deleting a link of the link type between a first object of the first object type and a second object of the second object type requires only permissions for viewing the first object and the second object.

In some embodiments, the server 102 is programmed to manage granular policies. With each data source leads to a distinct set of object types and link types, the access control of the data source can apply at not only these levels but also the object level, link level, object property level, or link property level with granular policies. A certain granular policy can restrict access to certain ontology entities to certain user accounts based on certain attribute values of the certain user accounts or certain properties of the certain ontology entities. As a result, only those user accounts having the certain attribute values and those ontology entities having the certain property values would meet the requirements of the certain granular policy, and only the certain user accounts would have access to the certain ontology entities or the certain properties of the certain ontology entities. For example, the certain granular policy can allow user accounts from Europe to see and edit European objects. When ontology entities are represented in the object databases, such as one with rows and columns, the access controls that apply at the ontology entity level would correspond to row-level access controls, and those that apply at the property level would correspond to column-level access controls.

Figure 3:
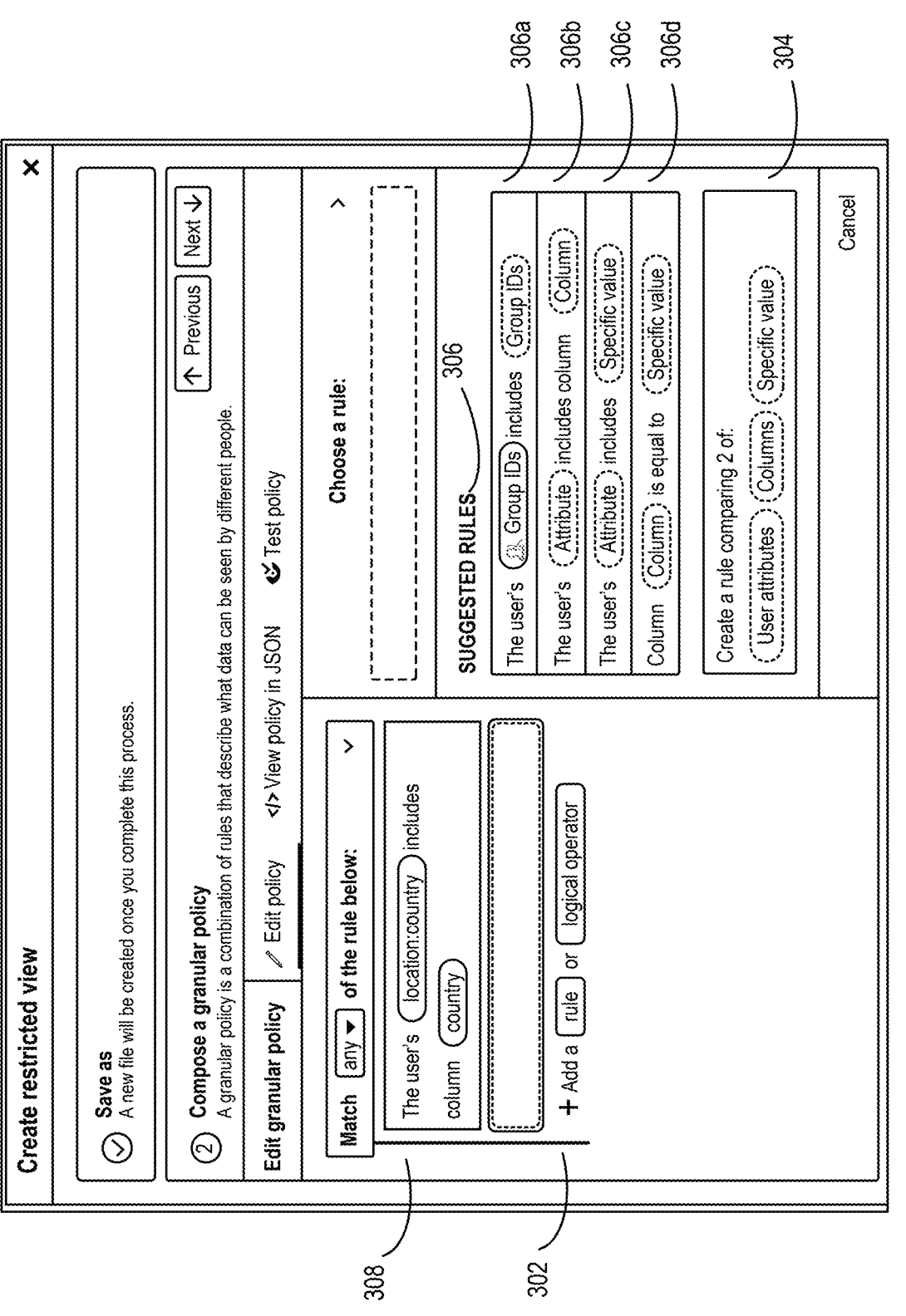
FIG. 3 illustrates an example graphical user interface for creating a granular policy.

FIG. 3 illustrates an example graphical user interface for creating a granular policy. In some embodiments, a granular policy can comprise one or more rules combined by logical operators. An administrator, such as a user in the ontology owner role, can add a rule or logical operator using the buttons in the area 302. For adding a rule, an initial mechanism of choosing two of three items for comparison can be employed in the area 304, and some sample comparisons are listed in the area 306. The initial mechanism allows three types of comparisons. The first type of comparison compares an attribute of a user account ("user attribute") with a specific value, and the rule 306c is an example. The second type of comparison compares a property of an ontology entity ("ontology entity property" corresponding to a column) with a specific value, and the rule 306d is an example. The third type of comparison compares a user attribute with an ontology entity property, and the rule 306a and the rule 306b are examples. The administrator can choose two of the three items in the area 304, specify a relational operator, such as "includes" or "is equal to", and obtain an initial rule, such as the rule 306b. The user can then instantiate each of the items, such as assigning "Group IDs" to the attribute item and "Group IDs" to the column item of the rule 306b, to get the final rule, such as the rule 306a, which indicates that the Group IDs user attribute includes a value that is not manually specified but comes from the "Group IDs ontology entity property.

In some embodiments, a final rule can then be displayed in the area 308, and it can be combined with existing rules using one or more logical operators, such as "any". The default access scope for a specific user in an appropriate user role when a rule is satisfied can be the objects that are compared in the rule or all objects otherwise. For example, the default access scope for the specific user from satisfying the rule 306a can be all objects where the Group IDs property match the Group IDs attribute of the specific user. The default access scope for the specific user from satisfying the rule 306c can be all objects. The default access scope for the specific user from satisfying the rule 306d can be all objects where the specified ontology entity property is equal to the specified value. The default access scope for satisfying a combination of rules can be the intersection of the access scopes of the matched rules. Additional elements can be included in the area 302, the area 304, or another area in the graphical user interface for specifying the access scope when each rule or the combination of rules is satisfied, which can be limited to specific properties of the objects. For example, a certain access scope can be defined to exclude from access those object properties that are being compared in the rules and the values thereof for users in roles that have editing permissions, to reduce disruptions to the application of the rules.

As discussed above, in some embodiments, the granular polices are applied on a per data source basis. The access controls associated with data sources can take precedence over those based on granular policies. For example, an object type might have two properties A and B that come from different data sources. For a specific user, the access controls associated with the data sources can determine that the ontology entity property B is inaccessible. When relevant granular policies are applied, only the ontology entity property A is then available for comparison, and the application result can be that only the ontology entity property A of certain objects are accessible. The presentation of the application result can depend on the exact user roles and permissions. When an ontology entity property is accessible, it can mean that only the metadata of the ontology entity property (e.g., identifier) is accessible, or both the metadata and actual value are accessible. Therefore, in the example, the metadata of the ontology entity property A would be shown and the value of this ontology entity property would be shown for the certain objects to the specific user. On the other hand, the metadata of the ontology entity property B can be shown with no value shown, or alternatively no information regarding the ontology entity property B would be shown depending on the user role of the specific user.

3.2. Providing a Unified Ontology Query Interface Across Multiple Object Databases In some embodiments, the server 102 is programmed to support an API for querying an ontology. The API includes a group of functions, such as filters or aggregators, which are typically predicated on ontology entity properties. Different properties can support the same function. Certain functions apply to specific property types, such as a string or a number, and thus all properties of that property type across ontology entity types. Some functions apply to specific ontology entity types and thus additional ontology entity types that derive from the specific ontology entity types. The applicability of each function or other relevant information regarding the function can be recorded as metadata of the function. The API can enable the generation of an ontology entity set, such as an object set, through the use of filters. Each filter generally takes as an input a criterion to be satisfied by a property, thus filtering out those ontology entities having that property that does not satisfy the criterion. Each filter can also simply take a list of identifiers of ontology entities for retrieving the set of ontology entities identified by the list of identifiers. The API can also enable the generation of specific values through the use of aggregators. Each aggregator can be directly predicated on a property across all ontology entities or, after the property values are grouped into buckets, across all ontology entities in each bucket. Example aggregators include count( ), average( ), min( ), or max( ). Example grouping operators include topValues( ) to extract the top values of the property or by Year to group the property values by year.

As discussed above, each ontology entity type can be mapped to multiple object databases, where ontology entities of the ontology entity type are represented. Ontology entities of the ontology entity type can be represented in different ways in different object databases. As one example, in one object database, ontology data can be represented in an object-centric manner, while in another object database, links can also be represented as first-class citizens. As another example, in one object database, certain properties of the ontology entity type can be stored in a compressed form and thus generally unavailable for querying, while in another object database, some properties of the ontology entity type can all be stored as strings that are suitable for specific operations and thus can be operated on by specific functions.

In some embodiments, the server 102 is programmed to associate each object database with functional information that can be matched with metadata of the functions in the API for querying the ontology. As different functions can apply at different granularities, the functional information can be recorded at different granularities according to the mapping between ontology entity types and object databases. As one example, when an object database represents objects of an object type as rows and properties as columns, certain columns may be associated with functional information, which can be part of the column's metadata, such as that a column is of a specific data type, is compressed or otherwise not suitable for querying, or has corresponding indices. As another example, when an object database represents links of a link type as edges between nodes, the edges can be associated with functional information, which can be part of the edge's metadata, such as that an edge represents a link that can be directly queried.

In some embodiments, when a function is called, the server 102 is configured to determine which object databases to access to execute the function efficiently. The determination can depend on the ontology entity type on which the function is called, the nature of the function, or other factors, as further discussed below. The server 102 can be programmed to determine an ontology entity type on which the function operates or which the function takes as an input as part of the conventional process of executing a function. The server 102 can be programmed to further identify the set of object databases with which the ontology entity type is associated according to an existing mapping, and select at least one from the set of object databases to access.

In some embodiments, the server 102 can be programmed to perform the selection by matching the function's metadata with the functional information associated with the set of object databases, as discussed above and illustrated below. The server 102 can be programmed to perform the selection by further estimating the performance of the set of object databases in executing the function. The estimation can be performed by partially or selectively executing the function. For example, while the function is to obtain an aggregation over each of five groups, the estimation can be performed by obtaining an aggregation over one of the five groups. The server 102 can also be programmed to perform the selection according to a predetermined list of priorities assigned to the set of object databases. The assignment can be performed based on the number of properties the representation of which is suitable for querying in an object database, the number of properties that are indexed in an object database, the historical frequency of use for an object database, or other factors. In other embodiments, the server 102 can be programmed to perform the selection by considering multiple functions simultaneously. For example, an object database can serve multiple functions being called can be preferred to another object database that can serve only one of the functions being called based on reduced overhead associated with database access.

In some embodiments, upon selecting an object database, the server 102 is programmed to access the object database and retrieve a piece of data in executing the function based on the transformation from the definition for the ontology entity type on which the function is called to the schema for the object database. Depending on the nature of the function, the server 102 can be programmed to retrieve one or more pieces of data from one or more object databases in executing the function. The server 102 is further programmed to transform the combination of the one or more pieces of data back into ontology data in response to the function call. When the retrieval is unsuccessful, the server 102 can be programmed to re-select another object database from the set of object databases.

FIG. 4 illustrates examples calls to the API for querying an ontology. In the set of functions 402, the Objects. search( ) function in the API can be used to specify a query. The invocation of this function is followed by the invocation of a function that corresponds to an ontology entity type, such as a flight object type that corresponds to a flight, to specify the return type of the query. All ontology entity types can support the filter( ) function that implements a filter, which means that the filter( ) function can operate on all ontology entity types. The flight object type has a property of departureAirportCode, which corresponds to the departure airport code of a flight. All properties can support the exactMatch( ) function as one of the matching functions. The exactMatch( ) function thus operates on a property of an ontology entity and takes a value or anther property as an input. Therefore, in the set of functions 402, the filter( ) function is requesting the set of flight objects, where the departureAirportCode has a value of airportCode, to look for the set of flights that depart from the airport having an airport code of airportCode. The searchAround functionality enables traversing links, and a corresponding function can be created for each link type. A flight object type can be linked to a passenger object type that corresponds to a passenger of the flight. The searchAroundPassengers( )

function thus operates on an ontology entity type that has links to the passenger object type and, when invoked on a flight object, finds all the passenger objects linked to the flight object. Therefore, calls of the set of functions 402 returns the set of passenger objects that are linked to the set of flight objects returned by the filter( ) function, that correspond to the set of passengers of these flights.

In some embodiments, to execute the set of functions 402, the server 102 is programmed to first identify the set of flight objects that satisfy the filter criterion and then identify the set of passenger objects that are linked to the set of flight objects. For the first identification, the exactMatch( ) function operates on or takes as an input a property value. The server 102 can thus be programmed to determine an object database for the flight object type that enables fast retrieval based on a particular property value of an object. The server 102 can be further programmed to detect that a particular object database is a relational database that has an index on the column representing the departureAirportCode property and select the particular object database. For the second identification, the searchAround functionality operates on links. The server 102 can thus be programmed to determine an object database for the flight object type that allows efficient traversal of links connecting flight objects with passenger objects. The server 102 can be programmed to detect that a certain object database is a graph database that represents links between flight objects and passenger objects as edges and select the certain object database. Finally, in response to calls to the set of functions 402, the server 102 is configured to return the result of the second identification.

In the set of functions 404, the Objects.search( ) and filter( ) functions in the API to query the ontology have been discussed above. The building object type has a property of maxOccupancy, which corresponds to the maximum occupancy of the building, and a property of inFloodZone, which corresponds to an indication of whether the building is in a flood zone. The Filters.and( ) function in the API can be used to combine filters using the and logical operator, which takes two Boolean expressions as inputs. In this case, the first Boolean expression is building.maxOccupancy.gt(100) to indicate whether the building's maximum occupancy is greater than 100 people. The second Boolean expression is building.inFloodZone.isTrue( ) which indicates whether the building is in a flood zone. Therefore, the set of functions 404 returns the set of building objects that are returned by the filter( ) function.

In some embodiments, to execute the set of functions 404, the server 102 is programmed to identify the set of building objects that satisfy the filter criterion, which is a combination of two filter criteria. The two filter criteria involve different functions, but both gt( ) and is True( ) operate on or take as an input a property value. The two filter criteria can lead to access to different object databases even if they apply to the same building object type. In this case, the maxOccupancy property can be a property that is specific to the building object type or is commonly accessed, while the inFloodZone can be a property that is inherited from a related ontology entity type, such as a geoArea object type, and not commonly accessed. Furthermore, a first object database can store a subset of the properties of building objects that are commonly accessed in uncompressed form in hot storage and the remaining properties in archived form in cold storage. A second object database can be created to specifically serve geospatial queries and have specific indices for relevant properties, including the inFloodZone property of the building objects. The server 102 is thus programmed to detect that the maxOccupancy property can be efficiently queried in the first object database and select that object database to acquire a first set of building objects that satisfy the first filter criterion. The server 102 is programmed to then detect that the inFloodZone property can be efficiently queried in the second object database and select that object database to acquire a second set of building objects that satisfy the second filter criterion. Finally, in response to calls to the set of functions 404, the server 102 is configured to return the intersection of the first set of building objects and the second set of building objects.

In some embodiments, in executing a function call, the server 102 is programmed to consider data availability in an object database, which can vary depending on the versioning strategy. The function calls discussed herein would correspond to the read requests discussed above. Sometimes, the versioning strategy allows a latest version of an ontology entity of an ontology entity type to be accessed even when the latest version is not yet represented in all the object databases associated with the ontology entity type. The server 102 thus can be programmed to track the list of object databases where the latest version is available, which limits the choices of object databases in executing a function all.

In some embodiments, in executing a function call, the server 102 is programmed to also consider data access control in the ontology, which can vary depending on properties of ontology entities and attributes of user accounts, as discussed in Section 3.1. The server 102 is programmed to determine whether the user accounts instructing executing the function has permission to access each ontology entity on which the function operates, and such permission would generally apply to all the object databases associated with the corresponding ontology entity type. In certain embodiments, the functions themselves can be associated with access control, so permissions can be determined before a function is applied to any ontology entity type. For example, access to fuzzy filters that allow fuzzy matching could be granted to only user accounts that are associated with more than a certain amount of experience, regardless of which ontology entities are to be fuzzy matched. Among the set of user accounts that are allowed to use the fuzzy filters, granular security policies can then further determine which user accounts can have read or view access to the ontology entities being fuzzy matched. Generally, any portion of an ontology entity that is not accessible to a user account becomes a null value to the user account.

3.3. Determining Query Execution Plans Using Sampling Operations

3.3.1. Initial Processing of Ontology Queries

In some embodiments, the server 102 is programmed to receive a query of an ontology from a user device, as discussed above. The ontology query can include one or more calls of functions in the API of the ontology. The server 102 is programmed to then plan the execution of the ontology query, starting with selecting an object database from one or more object databases for each ontology entity type covered by the ontology query. In certain embodiments, the server 102 can be programmed to minimize the total number of object databases selected for the ontology entity types covered by the ontology query. For a given object database, the server 102 can be programmed to then determine how the ontology query is translated to database queries or operations. The determination can be made based on the mapping between the ontology entity types and the plurality of object databases, including a transformation between the definition for an ontology entity type and the schemas for the corresponding object databases.

As discussed above, the API includes aggregators each directly predicated on a property of an ontology entity type across all ontology entities of the ontology entity type or, after the property values are grouped into buckets, across all ontology entities of the ontology entity type in each bucket. When the selected object database has tables of rows and columns, for example, such an aggregator (together with a related grouping function) can correspond to aggregating values in a column of a table. The API also includes functions that can be invoked on different ontology entity types, which when called together would lead the exploration of ontology entities of multiple ontology entity types. When the selected object database is the same for the multiple ontology entity types and has tables of rows and columns, for example, these functions can lead to joining two tables. The API also includes the searchAround functionality, which leads to various functions specific to respective ontology entity types, that enables traversing links between objects. When the selected object database has tables of rows and columns, for example, such a searchAround-based function can also lead to joining two tables. For example, the searchAroundPassengers( ) function when invoked on a set of flight objects, can be used to find a relationship between the passenger objects linked to the set of flight objects and specific information of the set of flight objects, such as the arrival city. The function can thus lead to a join in the selected object database between a flight table representing all flight objects with the specific information of interest and a passenger table representing all passenger objects based on the flight identifier property.

In some embodiments, the server 102 is programmed to identify a set of permissions for a user account associated with the user device and execute the ontology query subject to the set of permissions. As discussed above, there can be granular security policies that determine which properties of each ontology entity can be accessed by the user account and what types of access are granted to the user account, based on attributes of the user account. The set of permissions can then affect whether and how specific database queries can be executed. For example, to execute an ontology query that calls the searchAroundPassengers( ) function on a set of flight objects can require that the user account be able to execute the ontology query or the searchAround Passengers( ) function and view the portions of the selected object database that represent the flight objects and the passenger objects, such as the flight table and the passenger table or specific rows or columns therein.

In some embodiments, the server 102 is programmed to work with a distributed environment for query execution. The distributed environment can include a specific set of nodes that is configured for performing efficient and scalable data processing ("power nodes"). For example, the specific set of power nodes can run APACHE SPARK, which is a distributed processing system that supports data parallelism and fault tolerance, uses in-memory caching, and optimizes query execution for fast analytic queries. The server 102 can thus be configured to execute complex database queries via the specific set of power nodes for improved performance instead of executing those database queries via a single node or other nodes outside the specific set of power nodes.

In some embodiments, the server 102 is programmed to determine, when the ontology query leads to aggregations and joins, whether the execution will significantly benefit from the set of nodes configured for performing efficient and scalable data processing. In response to a positive determination, the server 102 can be programmed to route complex database queries related to the aggregations or joins to the specific set of power nodes, which can be programmed to retrieve data from the object databases, perform appropriate data processing operations on the retrieved data, and return the results.

3.3.2. Improving Query Execution Plans

In some embodiments, the server 102 is programmed to evaluate a set of joins and related database queries and determine how to reduce the amount of data processing in terms of retrieval, computation, transmission, or storage. The data processing can include retrieving rows from one table at a first location, transmitting those rows to a central location, retrieving rows from a second table at a second location, transmitting those rows to the central location, and performing a join at the central location. The first location can be identical to the second location or the central location. When a join comprises multiple joins, the result of a first join can replace one of the tables in the second join. The server 102 can be programmed to assess the potential result of each join and determine an order in which the joins are to be performed to reduce the amount of data processing.

FIG. 5A illustrates an example set of database queries including joins. This set of database queries 502 is to find a list of people in a state who own burgundy cars and determine what the makes and models of those cars are. In this example, the selected object database has a person table for people in the state that has 9,000 rows, an owner table for people in the state who own cars that has 7,000 rows, and a car table for types of cars that have been sold in a state that has 800 rows. Applying the first filter of person.city="Bruno" in the where clause to the person table leads to 6,000 rows, and performing the first join of person.id=owner.id based on the filter result (only a portion of the person table) leads to 5,000 rows (join results). Applying the second filter of car.color=burgundy in the where clause to the car table leads to 20 rows, and performing the second join of owner.cartypeid=car.typeid based on the filter result (only a portion of the car table) leads to 45 rows (join results).

A first execution plan for the set of database queries 502 is to apply the filters in the where clause to the person and car tables, perform the first join of person.id=owner.id, which forms a filter on the owner table rows, and perform the second join of owner.cartypeid=car.typeid. This first execution plan can involve retrieving (a) 6,000 rows of one or more columns from the person table, retrieving (b) 7,000 rows of one or more columns from the owner table, joining (a) and (b) to obtain (c) 5,000 rows, retrieving (d) 20 rows of one or more columns from the car table, and joining (c) and (d) to obtain 30 rows. The first execution plan can thus lead to a large amount of data processing, especially assuming that each set of rows to be joined is unsorted on the key column.

A second execution plan for the set of database queries 502 is to apply the filters in the where clause to the person and car tables, perform the second join of owner.cartypeid=car.typeid, which forms a filter on the owner table rows, and perform the first join of person.id=owner.id. This second execution plan can involve retrieving (a) 7,000 rows of one or more columns from the owner table, retrieving (b) 20 rows of one or more columns from the car table, joining (a) and (b) to obtain (c) 45 rows, retrieving (d) 6,000 rows of one or more columns from the person table, and joining (c) and (d) to obtain 30 rows. The second execution plan can thus lead to a much smaller amount of data processing compared to the first execution plan.

Therefore, in some embodiments, the server 102 is programmed to reduce the amount of data processing by applying filters whenever possible. Some of these filters are part of the database queries and thus readily apply, while some of them are formed from performing part of the database queries. The server 102 can be configured to estimate the effect of applying each filter by sampling, as further discussed below. For a filter that is part of the database queries, the server 102 can be programmed to directly compute to how many items in the sample population the filter applies. For instance, for the second filter of car.color=burgundy in FIG. 5A, the number of rows in the sample population from the car table that have burgundy as the value for the color column can be computed. The estimated size of the result of applying this filter alone can already provide an indicator that the size of the result of the second join in FIG. 5A is likely to be small. The server 102 can be programmed to further estimate the size of the result of the second join. For a filter that is formed from performing a database query, the server 102 can be programmed to compute the number of results of performing the database query in the sample population. For instance, for the second join of owner.cartypeid=car.typeid in FIG. 5A, the number of results in the sample population from joining the owner table and the car table upon applying the second filter can be computed, to obtain a filter on owner.cartypeid and thus owner.id that is part of the first join in FIG. 5A.

In some embodiments, the server 102 is programmed to effectively evaluate a join over the same ontology entity type by having multiple filters on that ontology entity type and determine how to reduce the amount of data processing. The data processing can include retrieving rows from a table, applying a first filter to get a first result, and applying the second filter on the first result to get a second result. The server 102 can be programmed to estimate the size of the result of each filter and determine an order in which the filters are to be applied to reduce the amount of data processing.

FIG. 5B illustrates another example set of database queries including joins. The difference of this set of database queries 504 from the example set of database queries 502 in FIG. 5A is the inclusion of multiple filters that apply to the same table, which can be considered as a join of two copies of the same table. In this example, applying the first filter of person.city="Bruno" in the where clause to the person table leads to 6,000 rows, and applying the second filter of person.age>50 in the where clause to the person table leads to 100 rows.

A first execution plan for the set of database queries 504 is to first apply the first filter of person.city="Bruno" and then apply the second filter of person.age>50. This first execution plan can involve retrieving 6,000 rows of one or more columns from the person table, and then filtering out 5,940 rows with the second filter to obtain 60 rows. A second execution plan for this set of database queries 504 is to first apply the second filter of person.age>50 and then apply the first filter of person.city="Bruno". This second execution plan can involve retrieving 100 rows of one or more columns from the person table and filtering out 40 rows to obtain 60 rows. The second execution plan can thus lead to a much smaller amount of data processing compared to the first execution plan.

Therefore, in some embodiments, the server 102 is programmed to reduce the amount of data processing by applying related filters in an appropriate order. The server 102 can be configured to estimate the effect of applying each filter by sampling. For each such filter, which would be part of the database queries, the server 102 can be programmed to directly compute to how many items in the sample population the filter applies, as discussed above. For instance, for the first two filters of person.city="Bruno" and person.age>50 in FIG. 5B, the number of results in the sample population from applying these two filters to the person table in some order can be computed.

In some embodiments, the server 102 is programmed to consider the set of permissions for the user account in the sampling process. When the user account does not have permission to access any property of an ontology entity that is referenced in a join or a related grouping operation or filter, the number of joins to be performed is reduced. Therefore, in addition to applying relevant filters, the server 102 is programmed to apply the set of permissions to the sample population to better estimate size of the result of executing the set of database queries.

In some embodiments, the server 102 is programmed to assemble an execution plan for the set of database queries including a set of joins, including an order in which the set of joins are performed. The server 102 is programmed to then execute a given set of database queries based on the execution plan to reduce the amount of data processing. The execution plan can be represented graphically. For an object database having tables of rows and columns, the execution plan can be represented as a tree, where the leaf nodes correspond to tables, and two nodes share a parent node when a join is to be performed over the data to which the two child node correspond. The set of database queries can then be executed by traversing the tree from the bottom up. The execution plan can also involve choosing a set of nodes to execute the set of database queries depending on the complexity of the set of database queries, as noted above. The server 102 can be further programmed to convert the result of executing the set of database queries back into ontology data as a reply to the original ontology query. The conversion can be performed based on the same mapping between the ontology entity types and the plurality of object databases, as noted above.

3.3.3. Managing Sampling Operations

In some embodiments, the server 102 is programmed to construct sample populations that are representative of the data in an object database. The server 102 can be programmed to divide the object database into partitions and distribute the data among these partitions in a manner that is agnostic to the nature of the data. For example, the server 102 can be programmed to perform database sharding by storing the object database across multiple nodes of a distributed environment. Each partition is considered as a shard, and each node can host one or more shards. When the object database has tables, different shards could contain different rows. A piece of data to be stored in the object database can then be assigned to one of the shards using range-based sharding, hashed sharding, geo sharding, or other known methods. The server 102 can be programmed to select any of the partitions as a representative sample population, such as choosing a shard hosted by a node in a location that enables utilization of less network bandwidth or more powerful computing resources. The server 102 can also be programmed to utilize part of a partition of a specific size or multiple partitions as a representative sample population depending on the amount of computing resources available for the sampling operations, the distribution of values for a relevant column as part of metadata of the object database, or other factors.

In some embodiments, the server 102 is programmed to perform sampling by executing a given set of database queries on the sample population and then extrapolating the sampling result to estimate the size of the result of executing the set of database queries on the entire object database. For example, when five cars are found to have the burgundy color in a sample population that is about one tenth in size of the full population, the number of cars having the burgundy color can be estimated to be fifty.

In some embodiments, the server 102 is programmed to perform sampling to simply estimate an intermediate result of executing the set of database queries, which can help assess the complexity of the set of database queries. When the set of database queries includes one or more aggregations with related grouping operations, sampling can be used to estimate the number of buckets resulting from the grouping operations or the results of the aggregations, both of which can affect the amount of data processing to be performed. The number of buckets obtained from the sample population can be used as the number of buckets for the full population. The result of any aggregation depends on whether the aggregation is additive in nature. The count function and the sum function are considered additive, and the result of such an aggregation obtained from a sample population is to be expanded for the full population. The other aggregations, such as the top or average functions, are not considered additive, and the result of such an aggregation obtained from the sample population can be used as the result for the full population. Depending on the assessed complexity of the set of database queries, the server 102 can be programmed to select an execution environment as part of the execution plan. For instance, when the assessed complexity of the set of database queries leads to an estimated amount of data processing that exceed a threshold, the set of database queries can be routed to the specific set of power nodes, as discussed above.

4. Example Processes

FIG. 6 illustrates a process of query execution planning over ontology-based databases in accordance with disclosed embodiments. FIG. 6 is shown in simplified, schematic format for purposes of illustrating a clear example and other embodiments may include more, fewer, or different elements connected in various manners. FIG. 6 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, the server 102 is programmed or configured to receive an ontology query for querying an ontology from a user device. The ontology includes a definition for each ontology entity type of a plurality of ontology entity types and a plurality of ontology entities instantiated from the plurality of ontology entity types. Each ontology entity type of the plurality of ontology entity types has one or more properties.

In step 604, the server 102 is programmed or configured to identify a set of permissions for accessing the ontology associated with a user account of the user device. In some embodiments, the set of permissions indicates whether the user account has a specific type of access to an ontology entity type, an ontology entity, or a property of an ontology entity.

In step 606, the server 102 is programmed or configured to transform the ontology query to a set of database queries, including a plurality of joins.

In some embodiments, a specific ontology entity type covered by the ontology query is represented in multiple forms in multiple object databases of a plurality of object databases. In the transforming, the server 102 is configured to select one or more object databases from the plurality of object databases for a set of ontology entity types covered by the ontology query. In certain embodiments, the server 102 is programmed to designate a plurality of shards in a distributed environment for an object database of the one or more object databases, and distribute data to be stored in the object database to the plurality of shards based on a sharding architecture. The sample then includes a single shard of the plurality of shards. In other embodiments, in the transmitting, the server 102 is configured to convert the result of the executing into one or more ontology entities based on one or more transformations between a set of definitions for the set of ontology entity types covered by the ontology query and one or more schemas for the one or more object databases.

In step 608, the server 102 is programmed or configured to estimate an amount of data processing associated with executing the set of database queries on one or more object databases of the plurality of object databases, comprising executing the plurality of joins in a specific order on a sample of the one or more object databases based on the set of permissions.

In some embodiments, in executing the plurality of joins, the server 102 is programmed to execute a first join of the plurality of joins according to the specific order on the sample, filter data to be joined in a second join according to the specific order using a result of executing the first join, and execute the second join on the sample.

In some embodiments, in the estimating, the server 102 is programmed to execute the plurality of joins in a second order on the sample based on the set of permissions, and compare a first amount of data processing associated with executing the plurality of joins in the specific order on the sample and a second amount of data processing associated with executing the plurality of joins in the second order on the sample. In certain embodiments, in the determining, the server 102 is programmed to include, in the execution plan, the order in which to execute the plurality of joins associated with a larger of the first amount of data processing and the second amount of data processing.

In some embodiments, in the estimating, the server 102 is programmed to execute a plurality of filters on a table in a particular order on the sample based on the set of permissions. In certain embodiments, the server 102 is programmed to execute a grouping operation or an aggregation on the sample based on the set of permissions. In other embodiments, the server 102 is configured to extrapolate an amount of data processing associated with executing the plurality of joins in the specific order on the sample based on the set of permissions.

In step 610, the server 102 is programmed or configured to determine an execution plan for the set of database queries based on a result of the estimating. In some embodiments, the server 102 is programmed to detect that the amount of data processing exceeds a threshold, and include, in the execution plan, an instruction to execute the set of database queries via a set of computing nodes having a high-performance, scalable architecture.

In step 612, the server 102 is programmed or configured to cause executing the set of database queries on the one or more object databases according to the execution plan.

In step 614, the server 102 is programmed or configured to transmit a reply to the ontology query to the user device based on a result of the executing.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
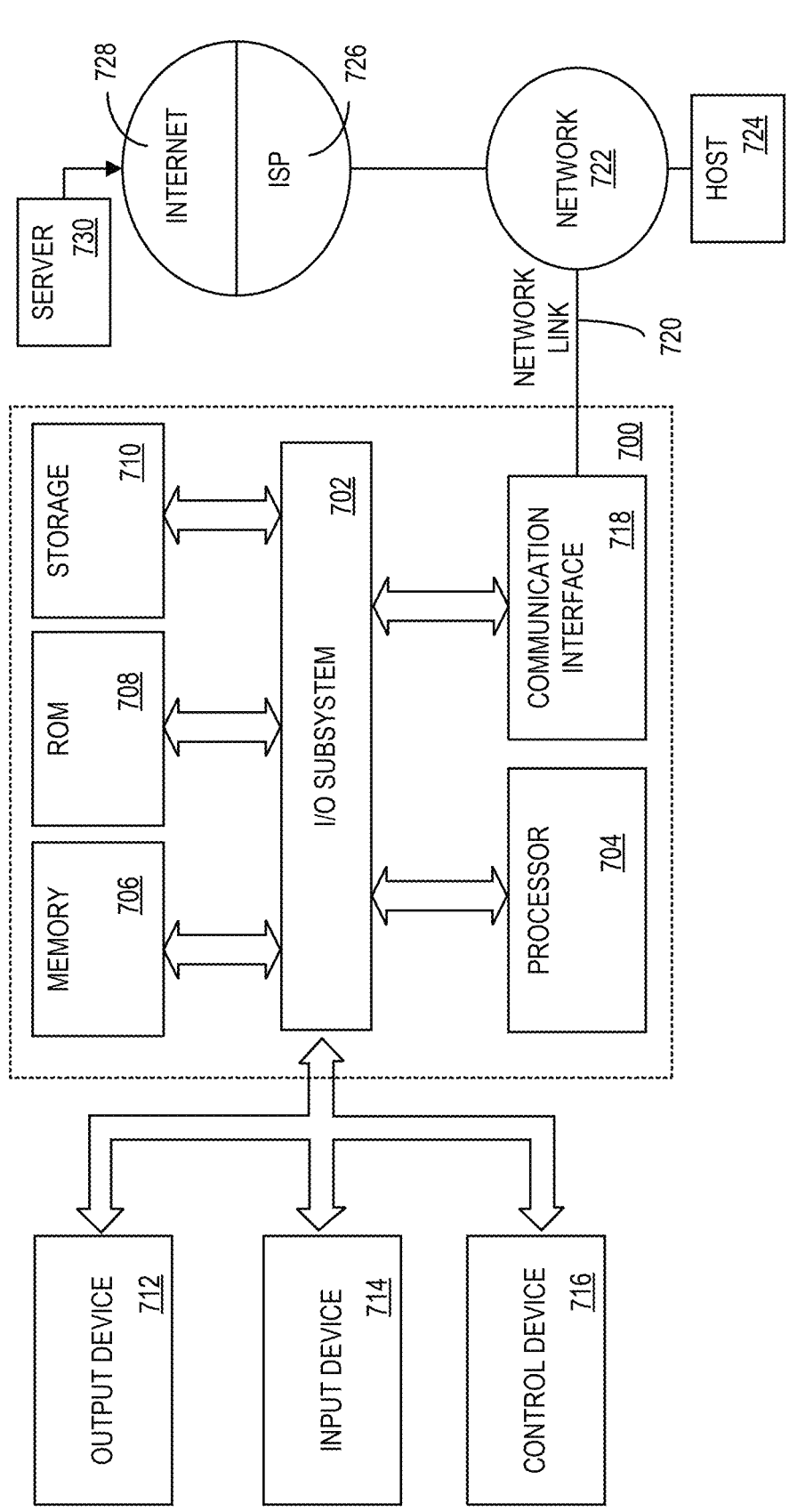
FIG. 7 illustrates a computer system upon which various embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or Advanced RISC Machines (ARM) processor.

Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as flash memory, or solid-state storage, magnetic disk, or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, Uniform Resource Locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using SQL or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of query execution planning over ontology-based databases, comprising:

receiving an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties;

identifying a set of permissions for accessing the ontology associated with a user account of the user device;

transforming the ontology query to a set of database queries, including a plurality of joins;

estimating an amount of data processing associated with executing the set of database queries on one or more object databases of a plurality of object databases representing the ontology, comprising executing the plurality of joins in a specific order on a sample of the one or more object databases based on the set of permissions;

determining an execution plan for the set of database queries based on a result of the estimating;

causing executing the set of database queries on the one or more object databases according to the execution plan;

transmitting a reply to the ontology query to the user device based on a result of the executing, wherein the method is performed by one or more processors.

2. The computer-implemented method of claim 1, the set of permissions indicating whether the user account has a specific type of access to an ontology entity type, an ontology entity, or a property of an ontology entity.

3. The computer-implemented method of claim 1, a specific ontology entity type covered by the ontology query being represented in multiple forms in multiple object databases of the plurality of object databases, the transforming comprising selecting the one or more object databases from the plurality of object databases for a set of ontology entity types covered by the ontology query.

4. The computer-implemented method of claim 3, further comprising:

designating a plurality of shards in a distributed environment for an object database of the one or more object databases;

distributing data to be stored in the object database to the plurality of shards based on a sharding architecture, the sample including a single shard of the plurality of shards.

5. The computer-implemented method of claim 3, the transmitting comprising converting the result of the executing into one or more ontology entities based on one or more transformations between a set of definitions for the set of ontology entity types covered by the ontology query and one or more schemas for the one or more object databases.

6. The computer-implemented method of claim 1, executing the plurality of joins comprising:

executing a first join of the plurality of joins according to the specific order on the sample;

filtering data to be joined in a second join according to the specific order using a result of executing the first join;

executing the second join on the sample.

7. The computer-implemented method of claim 1, the estimating further comprising:

executing the plurality of joins in a second order on the sample based on the set of permissions;

comparing a first amount of data processing associated with executing the plurality of joins in the specific order on the sample and a second amount of data processing associated with executing the plurality of joins in the second order on the sample.

8. The computer-implemented method of claim 7, the determining comprising including, in the execution plan, the order in which to execute the plurality of joins associated with a larger of the first amount of data processing and the second amount of data processing.

9. The computer-implemented method of claim 1, the estimating further comprising executing a plurality of filters on a table in a particular order on the sample based on the set of permissions.

10. The computer-implemented method of claim 1, the estimating further comprising executing a grouping operation or an aggregation on the sample based on the set of permissions.

11. The computer-implemented method of claim 1, the estimating further comprising extrapolating an amount of data processing associated with executing the plurality of joins in the specific order on the sample based on the set of permissions.

12. The computer-implemented method of claim 1, the determining comprising:

detecting that the amount of data processing exceeds a threshold;

including, in the execution plan, an instruction to execute the set of database queries via a set of computing nodes having a high-performance, scalable architecture.

13. A system for query execution planning over ontology-based databases, comprising:

a memory;

one or more processors coupled to the memory and configured to perform:

receiving an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties;

identifying a set of permissions for accessing the ontology associated with a user account of the user device;

transforming the ontology query to a set of database queries, including a plurality of joins;

estimating an amount of data processing associated with executing the set of database queries on one or more object databases of a plurality of object databases representing the ontology, comprising executing the plurality of joins in a specific order on a sample of the one or more object databases based on the set of permissions;

determining an execution plan for the set of database queries based on a result of the estimating;

causing executing the set of database queries on the one or more object databases according to the execution plan;

transmitting a reply to the ontology query to the user device based on a result of the executing, wherein the method is performed by one or more processors.

14. The system of claim 13, a specific ontology entity type covered by the ontology query being represented in multiple forms in multiple object databases of the plurality of object databases, the transforming comprising selecting the one or more object databases from the plurality of object databases for a set of ontology entity types covered by the ontology query.

15. The system of claim 14, the one or more processors further configured to perform:

designating a plurality of shards in a distributed environment for an object database of the one or more object databases;

distributing data to be stored in the object database to the plurality of shards based on a sharding architecture, the sample including a single shard of the plurality of shards.

16. The system of claim 13, executing the plurality of joins comprising:

executing a first join of the plurality of joins according to the specific order on the sample;

filtering data to be joined in a second join according to the specific order using a result of executing the first join;

executing the second join on the sample.

17. The system of claim 13, the estimating further comprising:

executing the plurality of joins in a second order on the sample based on the set of permissions;

comparing a first amount of data processing associated with executing the plurality of joins in the specific order on the sample and a second amount of data processing associated with executing the plurality of joins in the second order on the sample.

18. The system of claim 17, the determining comprising including, in the execution plan, the order in which to execute the plurality of joins associated with a larger of the first amount of data processing and the second amount of data processing.

19. The system of claim 13, the estimating further comprising executing a plurality of filters on a table in a particular order on the sample based on the set of permissions.

20. A non-transitory, computer-readable storage medium storing one or more sequences of instructions which when executed cause one or more processors to perform:

receiving an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties;

identifying a set of permissions for accessing the ontology associated with a user account of the user device;

transforming the ontology query to a set of database queries, including a plurality of joins;

estimating an amount of data processing associated with executing the set of database queries on one or more object databases of a plurality of object databases representing the ontology, comprising executing the plurality of joins in a specific order on a sample of the one or more object databases based on the set of permissions;

determining an execution plan for the set of database queries based on a result of the estimating;

causing executing the set of database queries on the one or more object databases according to the execution plan;

transmitting a reply to the ontology query to the user device based on a result of the executing.

* * * * *